United States Patent
Puuskari et al.

(10) Patent No.: US 7,167,447 B2
(45) Date of Patent: Jan. 23, 2007

(54) TRANSPORTING QOS MAPPING INFORMATION IN A PACKET RADIO NETWORK

(75) Inventors: Mikko Puuskari, Helsinki (FI); Juha Kalliokulju, Vesilahti (FI); Tero Mäkelä, Helsinki (FI); Tuija Hurtta, Espoo (FI); Matti Turunen, Tampere (FI); Jan Suumäki, Tampere (FI)

(73) Assignee: Nokia Networks Oy, Espoo (FI)

( * ) Notice: Subject to any disclaimer, the term of this patent is extended or adjusted under 35 U.S.C. 154(b) by 761 days.

(21) Appl. No.: 09/891,509

(22) Filed: Jun. 27, 2001

(65) Prior Publication Data

US 2002/0032800 A1 Mar. 14, 2002

Related U.S. Application Data (63) Continuation of application No. PCT/FI00/00003, filed on Jan. 4, 2000.

(30) Foreign Application Priority Data

| Jan. 5, 1999 | (FI) | 990009 |
| Feb. 9, 1999 | (FI) | 990253 |
| May 24, 1999 | (FI) | 991177 |

(51) Int. Cl.
  H04J 1/16 (2006.01)
  H04J 3/24 (2006.01)
  H04J 3/16 (2006.01)
  H04Q 7/00 (2006.01)
  H04B 7/216 (2006.01)
  H04L 12/66 (2006.01)
  H04L 12/28 (2006.01)

(52) U.S. Cl. ............ 370/231; 370/235; 370/328; 370/335; 370/349; 370/352; 370/389; 370/392; 370/395.21; 370/468; 455/452.2

(58) Field of Classification Search ........... 370/335, 370/348, 352–356, 329, 332, 441, 443, 468; 455/433, 452.2
See application file for complete search history.

(56) References Cited

U.S. PATENT DOCUMENTS

| 5,459,722 A | 10/1995 | Sherif | |
| 6,574,201 B1 * | 6/2003 | Kreppel | 370/328 |
| 6,608,832 B1 * | 8/2003 | Forslow | 370/353 |
| 6,636,502 B1 * | 10/2003 | Lager et al. | 370/352 |

(Continued)

FOREIGN PATENT DOCUMENTS

EP 774 848 5/1997

(Continued)

Primary Examiner—Wellington Chin
Assistant Examiner—Melanie Jagannathan
(74) Attorney, Agent, or Firm—Pillsbury Winthrop Shaw Pittman LLP (57) ABSTRACT

A method and a GGSN support node for sending data packets to a mobile station in a mobile communications system from an external communication system. The GGSN receives data packets from the external communication system in a first plurality of data flows which it maps to a second plurality of data flows in the mobile communications system. It establishes at least one filter for controlling the mapping and associates the filter with the mobile station. It also maps at least one of the data flows on the basis of the filter and configures the filter on the basis of information which preferably originates from the mobile station.

20 Claims, 4 Drawing Sheets

U.S. PATENT DOCUMENTS

6,683,853 B1 * 1/2004 Kannas et al. .............. 370/237

FOREIGN PATENT DOCUMENTS

| GB | 2 312 592 | 10/1997 |
| WO | WO 97/36405 | 10/1997 |
| WO | WO 98/28938 | 7/1998 |
| WO | WO 99/05828 | 2/1999 |
| WO | WO 99/16266 | 4/1999 |

* cited by examiner

*G/U RF = GSM/UMTS Radio Interface

TRANSPORTING QOS MAPPING INFORMATION IN A PACKET RADIO NETWORK

This application is a continuation of International Application No. PCT/FI00/00003 filed on Jan. 4, 2000, which designated the U.S. and was published under PCT Article 21 (2) in English. International Application No. PCT/FI00/00003 relies for priority on Finnish Application 991177 filed on May 24, 1999, on Finnish Application No.990253 filed on Feb. 9, 1999, and on Finnish Application No. 990009 filed on Jan. 5, 1999.

BACKGROUND OF THE INVENTION

The invention relates to methods and equipment for controlling Quality of Service (QoS) in mobile communications systems having a packet data transmission capability. More specifically, the invention relates to sending data packets on the basis of QoS mapping information and transporting QoS mapping information between various nodes in such a mobile communications system.

For the GPRS (General Packet Radio Service) phase 2 and UMTS (Universal Mobile Telecommunications System) systems a more comprehensive QoS support is required. For this purpose, QoS-related information must be maintained at the network boundary elements, e.g., at a Mobile Station (MS) and a GGSN (Gateway GPRS Support Node).

Currently it is not possible to transform information needed to perform QoS mapping and translation functions between the external network QoS mechanisms and mobile network specific QoS mechanisms. This means that only very static QoS translation can be carried out by the mobile network boundary nodes. For providing different QoS values for different applications (such as real-time or non-real-time multimedia, file transmission, background e-mail transfer etc.) means for maintaining consistent information at the mobile station and the GGSN nodes are needed.

No solutions for this problem are known for GPRS/UMTS networks. For the Internet, there are mechanisms available that can be used to transport QoS or flow specific information. However, this information is interpreted by every node along the end-to-end transmission path and not only by the endpoints (the MS and the GGSN).

DISCLOSURE OF THE INVENTION

An object of the invention is to provide a mechanism for enabling more dynamic QoS provisioning for individual applications. This object is achieved with a method and equipment which are characterized by what is disclosed in the attached independent claims. Preferred embodiments of the invention are disclosed in the attached dependent claims.

The invention is based on a vision that QoS mapping information must be transferred between the GPRS/UMTS network boundaries. In other words, the invention provides a mechanism for mapping multiple downlink (mobile-station-terminated) IP flows (IPflow1, . . . IPflown) with different QoS needs to GPRS (or UMTS . . . ) flows. The latter flows are defined by PDP (Packet Data Protocol) contexts (PDP1 . . . PDPm) or QoS profiles (QoSp1 . . . QoSm) within one profile fulfilling the needs. The basic idea of the invention is that for at least some data flows (such as real-time applications), the mapping being performed in the boundary node (i.e., the GGSN) is based on a filter which is configurable (by selection or modification) from a user/terminal. Such a filter can be implemented as a set of predetermined parameters and/or conditions which are used to identify packets or data flows. A filter for a mobile station should comprise at least the IP address of the mobile station in question. The mobile station's IP address is known from the PDP context record, and it does not have to be transmitted in the filter specification between the MS and the GGSN. (In rare cases a mobile station may have more than one IP address.) Additionally, the filter may comprise any data which can be used for identifying data packets requiring a certain QoS, and which should therefore be multiplexed onto certain PDP contexts, such as a Source Address, an RSVP Flow Identifier, a Port Number (e.g. the TCP or UDP port number used), an Upper layer protocol (e.g. UDP, RTP, etc.), a Type of Service (IPv4), a Connection Type (IPv6) and/or a Traffic Class field (IPv6). The filter may also comprise the IP Address Space for giving a higher QoS to packets coming from a corporate network (e.g. an intranet) than for packets from the common Internet.

The filter according to the invention is used to define the characteristics of the IP flows that are to be mapped to the GPRS or UMTS flow in question. The terminal may control the filter identifying the filter parameters in an information element which can be included for example in a PDP context activation or a PDP context modification message. The filter can be also be defined/redefined in connection with QoS profile activation or modification.

According to a preferred embodiment of the invention, a default QoS class is defined. Data flows which do not conform to any defined filters are mapped to this default QoS class.

The problem solved by the invention is relevant in GPRS phase 2 and its future evolution, such as UMTS.

According to one embodiment, QoS information for the profile/context is included in the QoS Profile information element as in GPRS phase 1. The mapping and filtering information may be transferred in the 'protocol configuration options' information element, vendor-specific options, or in a new information element introduced and devoted to this purpose. This information may include source and/or destination IP addresses, TCP and UDP port numbers used, upper layer protocol information, possibly Secure Parameters Index (if IPSEC is used), differentiated services parameters, and RSVP filters and flow specifications, or some other identifier or parameters in the packets.

A different quality of service (QoS) profile may be requested for each PDP Address. For example, some PDP addresses may be associated with E-mail that can tolerate lengthy response times. Other applications, such as interactive applications, cannot tolerate delay, and they demand a very high level of throughput. These different requirements are reflected in the QoS profile. If a QoS requirement is beyond the capabilities of a PLMN (Public Land based Mobile Network), the PLMN negotiates the QoS profile as close as possible to the requested QoS profile. The MS either accepts the negotiated QoS profile or deactivates the PDP context.

An advantage of the invention is that the network elements (such as the SGSN nodes and the Base Station Subsystem) of a packet radio network do not have to interpret all QoS mechanisms of the external networks (IP, X.25 etc.) Instead, the mapping can be configured at the mobile-station end, and this configuration is transported to the other boundary node (i.e. the GGSN) of the packet radio network. Thus, the entire packet radio network does not have to be updated to support all new QoS mechanisms.

The mechanism according to the invention is very generic. In other words, it is applicable to a wide variety of situations and configurations. It allows flexible access, configuration and use of the filter information in the GGSN database. Use of the filter according to the invention is entirely case and operator specific. The MS subscriber is provided with means for indicating to the gateway node at the mobile/fixed network boundary how the different applications, connections, flows, or other attributes should be treated and which QoS should be used within the GPRS/UMTS network to transport the associated packets. Preferably, the GGSN should also maintain application/QoS/flow specific information.

Yet another advantage is that the flow/QoS specification transferred according to the invention (i.e. in the QoS profile establishment procedure or in the PDP context activation or a dedicated message) is very flexible. It may include source and destination IP addresses, TCP and UDP port numbers used, upper layer protocol information, possibly a Secure Parameters Index in the case IPSEC is used, differentiated services parameters, and RSVP filters and flow specifications, all of which are used to identify external applications, usages and flows that should be mapped to particular internal QoS classes or contexts. An advantage of the flexibility is that a new application does not necessarily require a new flow in the packet radio network. Instead, the invention allows flexible re-use of existing flows in an efficient manner.

Alternatively, information can be configured in a more static manner, in which case no dynamic change of attributes is possible. In this case the operator configures static conditions and translation of an external QoS to an internal QoS, for example, based on the used TCP/UDP port numbers. Yet another option is not to provide any QoS mapping functions and end-to-end QoS at all.

BRIEF DESCRIPTION OF THE DRAWINGS

The invention will be described in more detail by means of preferred embodiments with reference to the appended drawing wherein.

DETAILED DESCRIPTION OF THE INVENTION

Figure 1:
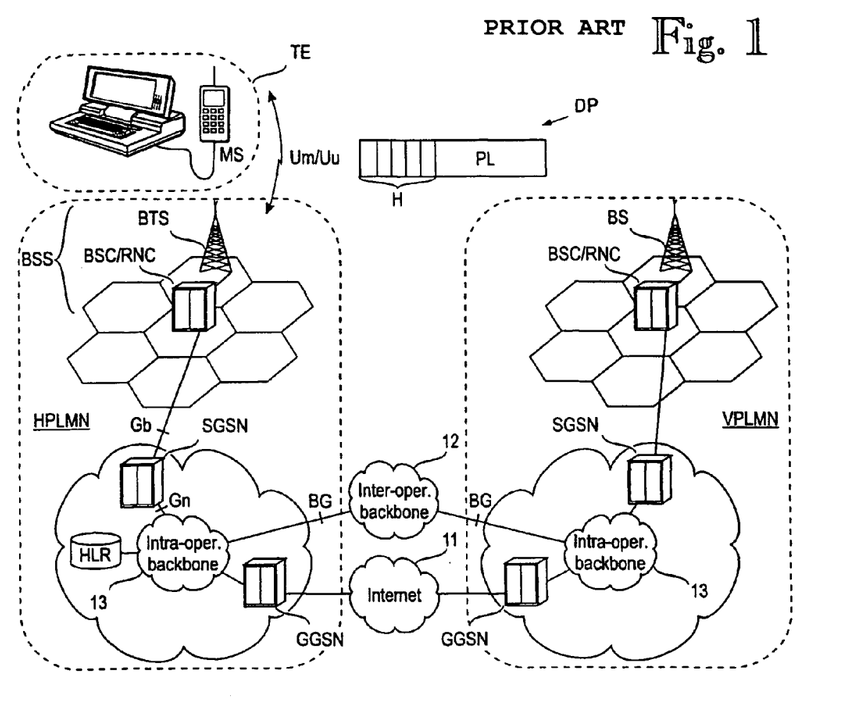
FIG. 1 shows the architecture of a known GPRS network.
Figure 2:
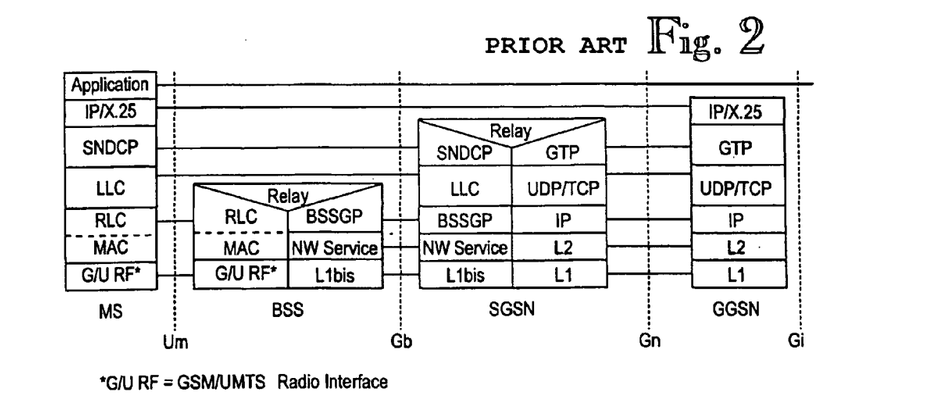
FIG. 2 shows a known GPRS transmission plane.

As shown in FIGS. 1 and 2, the present invention can be applied to any mobile communications system having a packet data transmission capability.

The term 'packet data protocol' (PDP) or 'PDP context' as used herein should be understood to generally refer to any state in a mobile station and in at least one network element or functionality, which state provides a data packet transmission path or a tunnel with a specific set of parameters through the mobile communications network. The term 'node' as used herein should be understood to generally refer to any network element or functionality which handles the data packets transferred through the PDP channel.

The invention can be especially preferably used for providing a general packet radio service GPRS in the pan-European digital mobile communication system GSM or in corresponding mobile communication systems, such as DCS1800 (also known as GSM1800) and PCS (Personal Communication System). In the following, preferred embodiments of the invention will be described by means of a GPRS packet radio network formed by the GPRS service and the GSM system without limiting the invention to this particular packet radio system.

The invention is equally applicable to third generation mobile networks, such as UMTS. In this case, the GSM radio interface will be replaced with an UMTS radio interface, as shown in FIG. 2.

Figure 3:
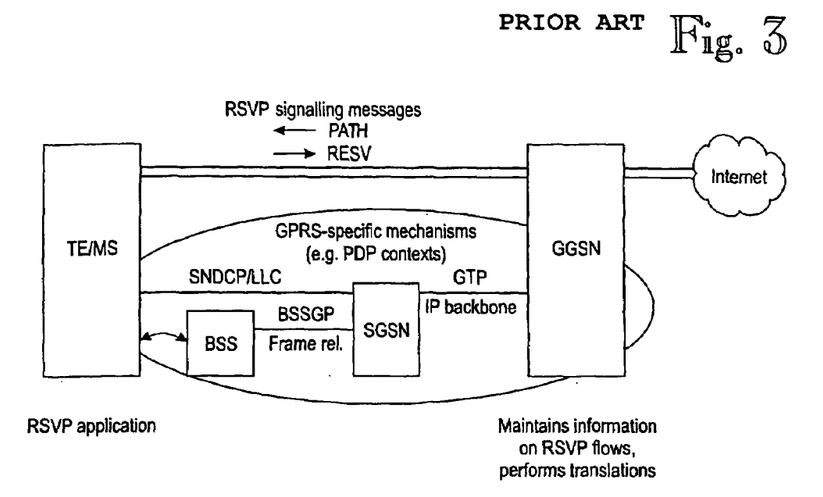
FIG. 3 shows the interworking between different network elements.

FIG. 3 illustrates the interworking between different network elements. After these modifications, a parameter-level mapping between differentiated services and RSVP in the Internet and in GPRS may be provided as follows, for example:

Priority information on the Internet is mapped to service precedence in the GPRS. An indication concerning real-time vs. non-real-time requirements on the Internet is mapped to a delay class and/or reliability information in the GPRS: at least two delay types are needed, but it is also possible to map traffic types more precisely to several delay classes.

Reliability information may be used to indicate the reliability requirements of each application in the form of one of at least two reliability classes. If reliable transmission (retransmissions, checksums and/or TCP) is needed, the profile associated with the data packets indicates reliability class 1. If reliable delivery over the radio interface is needed, but UDP in the GPRS backbone is sufficient, the profile associated with the data packets indicates reliability class 2. Depending on the requirements, the profile associated with the data packets may alternatively indicate reliability class 3, 4 or 5. Reliability classes 4 and 5 are used for real-time traffic.

A further optional feature of the present invention is a mapping of the QoS parameters used in the mobile-communication network to those used in a user application in the mobile packet data terminal or those used in the external communication system, and vice versa. The MS, knowing the requirements of the applications, determines the corresponding QoS profile values, establishes a new PDP context for these packets and indicates to the GGSN how to recognize packets belonging to this context. In the following, two examples of the mapping will be given.

Example 1 (given as an example of how the MS can decide which GPRS parameter values it chooses for the context).

Simple Integrated Media Access (SIMA) is a new simple approach presented as an Internet Draft by K. Kilkki, Nokia Research Center, June 1997. Internet Drafts are working documents of the Internet Engineering Task Force (IETF), its areas, and working groups. The SIMA is used as an example of an Internet QoS scheme because it is capable of providing a uniform service concept for different needs from file transfer applications using TCP/IP protocol with loose delay and packet loss requirements to real-time applications with very strict quality and availability requirements. According to the SIMA concept, each user defines only two issues before the connection setup: a nominal bit rate (NBR) and a selection between real-time and non-real-time service classes. The NBR may have eight values from 0 to 7.

Mapping of parameters from the SIMA to the GPRS and vice versa may be as follows, for example:

Real-time/non-real-time bit: if this bit indicates real-time require-ments, it is mapped to GPRS delay class 1, otherwise it is mapped to delay class 4. However, delay class 3 may be used for non-real-time services in case there is a special way to indicate best-effort traffic, e.g. this bit need not always be present, or a more precise definition is used to differentiate real-time, non-real-time, and best-effort traffic. A lower reliability class value may be assigned to real-time traffic than to non-real-time traffic in GPRS. Generally, reliability classes 1, 2, and 3 are usually used for non-real-time traffic and classes 3, 4, and 5 for real-time traffic in GPRS. For non-real-time traffic, the higher the NBR is, the lower reliability class value suitable for transmission.

| NBR values | GPRS service precedence value |
|---|---|
| 6 and 7 | 1 |
| 3, 4, and 5 | 2 |
| 0, 1, and 2 | 3 |

Different names, such as priority or Nominal Bit Rate and traffic type, may also be chosen for the parameters. The QoS Profile may include all the existing parameters (service precedence, reliability class, delay class, mean bit rate and peak bit rate). Alternatively, it could only include some of the parameters, such as the mean and peak bit rates. The QoS Profile could also include a maximum burst size parameters to ease buffer allocation procedure.

QoS scheduling in GPRS network elements (e.g. in an SGSN and a GGSN) is based on the delay class. This may require at least two buffers: one for real-time packets (this buffer should be much smaller!) and another one for non-real-time packets. Real-time traffic should always be sent before non-real-time traffic. Service precedence defines the order in which packets can be dropped in case of network congestion.

Example 2 (describes how to choose QoS values and establish a special profile to support a given differentiated services code point, for providing proper QoS profile values and a differentiated services code point value as filter information for configuring the filter).

Mapping a Type of Service (ToS) octet in the headers of IP PDUs (Packet Data Units) to GPRS attributes. The ToS octet in an IP header is not widely used at the moment. Its original purpose was to include traffic type information and to specify what kind of service is required from the packet delivery. Because the ToS octet is not in common use nowadays, it is possible to redefine the bits in that octet for the purposes of the present invention. A definition of the ToS octet is given in RFC 791. Bits 0 to 2 of ToS give the preference, bits 3 to 5 give the ToS required by the packet (e.g. delay, throughput, and reliability levels requested), and bits 6 to 7 are reserved for future use. RFC 1349 extends the ToS field by one bit (taken from the "reserved for future" bits). Thus, 4 bits can be used to indicate a ToS.

Mapping between the precedence bits (0 to 2 in ToS) and the GPRS service precedence may be as follows:

| bit values (0 to 2) | service precedence value |
|---|---|
| 111 and 110 | 001 (highest priority) |
| 101, 100, and 011 | 010 (normal priority) |
| 010, 001, and 000 | 011 (lowest priority) |

There are three different ways to perform the mapping between the traffic type information (i.e. ToS field in the ToS octet) and the GPRS delay class:

If only bit 3 in the ToS field is used to indicate the delay requirements in IP header: value 0 of bit 2 is mapped to GPRS delay class 1 or 2 and value 1 of bit 2 is mapped to GPRS delay class 4 (best effort).

If the whole ToS field in ToS is used for indicating delay requirements, i.e. 4 bits (bits 3–6) are available for that purpose, one possible mapping could be: bit value 1000 is mapped to GPRS delay class 1 (i.e. to bit value 000), bit value 0100 to GPRS delay class 2 (i.e. to value 001), ToS values 0010 and 0001 to GPRS delay class 3 (i.e. to value 010), and ToS value 0000 to GPRS delay class 4 (i.e. to value 011).

Another way of mapping the IP's ToS bits to the GPRS delay classes would be: 11x to delay class 1, 10x to delay class 2, 01x to delay class 3, and 00x to delay class 4. In this case, x means that there might be one or more additional bits used for the ToS, but they do not have any impact on the process of selecting the GPRS delay class. If more delay classes are defined for the GPRS later, the mapping could also take those additional bits into account.

Currently there is also one bit in the IP ToS field specifying the desired reliability level. If this bit is still available in the future, e.g. if the first choice above is chosen, this bit could carry reliability information and could be mapped to GPRS reliability class in the following way: a value 0 in bit 5 inside the ToS octet is mapped to the reliability class 000 (subscribed reliability class) and a value 1 is mapped to the reliability class 001 (defining the most reliable service). The use of that bit may however be too vague because the GPRS defines many other reliability levels as well and this cannot be expressed using only one bit.

According to a preferred embodiment of the invention, a default QoS class is defined, and data flows not conforming to any of the mapping criteria defined by the filter(s) are mapped to the default QoS class.

The mapping described above in Example 2 may be applied in a rather similar way in IPv6. The name of the appropriate field is then Traffic Class instead of the ToS.

FIG. 3 illustrates the operation of a GPRS mobile station and GPRS network elements, as well as integration with external network QoS concepts. The MS or the software in the terminal equipment TE (e.g. in a laptop computer) provides mapping of external network QoS requirements to GPRS QoS mechanisms. The TE could, for example, provide QoS management functions through an Application Programming Interface (API). The application-level software may insert QoS information or a profile tag into the data packets, e.g. inside the IP header itself, or it can indicate the correct flow which the packet belongs to using some other suitable means. It can also use the RSVP to convey the necessary information via appropriate mapping layers to lower layers. The software of the MS may, alternatively, decide the QoS profile based e.g. on the used source and destination IP addresses, or on the source and destination port numbers, or on some other information configured to the MS.

For Mobile Originated (MO) data, the MS schedules data packets based on the QoS information received from the application or from the GPRS protocol suite in the Terminal Equipment. The MS schedules the MO packets according to their delay class. On the SNDC layer, the MS selects the appropriate LLC SAP (Service Access Point) indicated by the SGSN during PDP context activation or modification.

Figure 4:
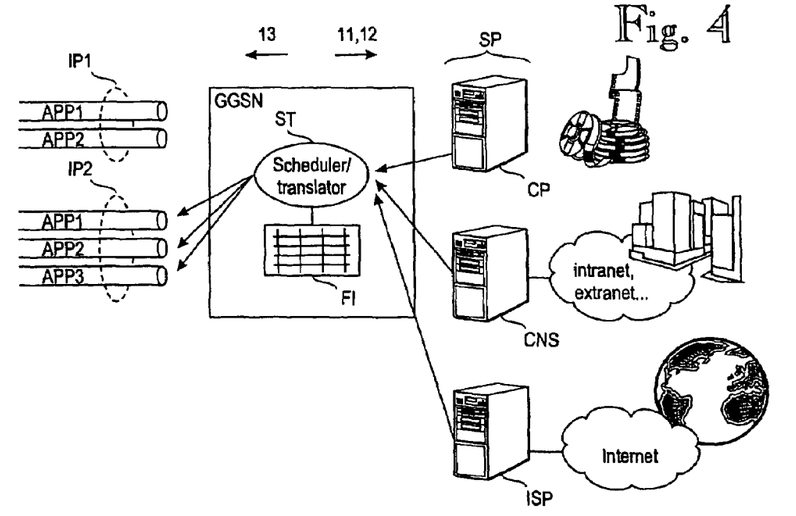
FIG. 4 shows a GGSN comprising the filter according to the invention.

FIG. 4 illustrates a GGSN comprising the filter according to the invention. The GGSN receives MS-terminated data packets from multiple sources, collectively referred to as Service Providers SP. FIG. 4 shows three typical service providers: an Internet Service Provider ISP for providing access to the Internet; a Company Network Server CNS for providing access to closed areas of the Internet, commonly called intranets and extranets; and Content Providers CP for providing access to various entertainment and news services, such as video-on-demand, etc.

The GGSN comprises a scheduler/translator ST. As its name implies, it schedules transmission of packets on the basis of network load, packet priority, arrival time, etc. The scheduling part of the ST is largely known to the skilled reader.

The translating part of the ST makes use of the filter FI according to the invention. It maps data packets from the IP networks (items 11 and 12 in FIG. 1) to the packet radio network (item 13 in FIG. 1). The invention provides a solution for a situation where several applications and data flows share a common IP address but require different QoS values.

Figure 5:
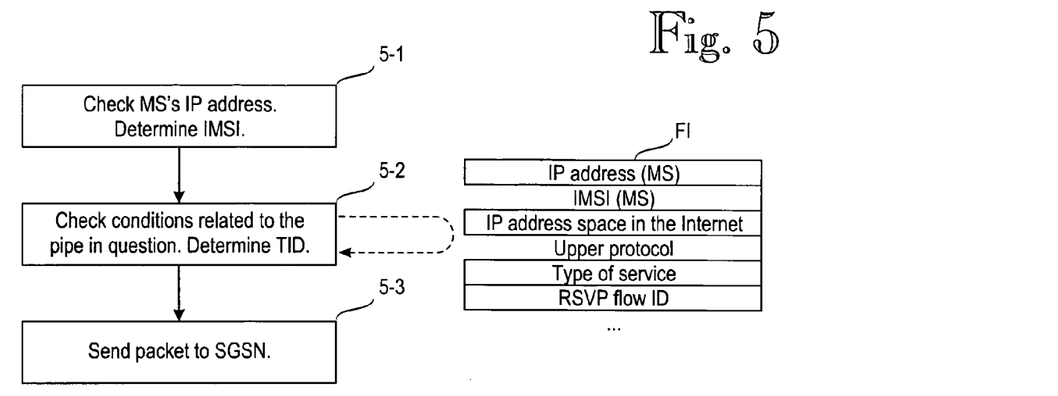
FIG. 5 shows the use of the filter according to the invention.

FIG. 5 illustrates the use of the filter FI according to the invention at the GGSN. In step 5-1 the GGSN receives a data packet addressed to a given mobile station MS. The GGSN reads the MS's IP address from the corresponding protocol header and uses the filter FI to determine the corresponding PDP context or QoS profile. The MS's IMSI can be determined from the packets' destination IP address. In step 5-2, the GGSN obtains the corresponding Tunnel Identifier TID. Next, in step 5-3, the GGSN sends the data packet via the SGSN to the MS via that particular context which is associated with an appropriate QoS for this packet.

Figure 6:
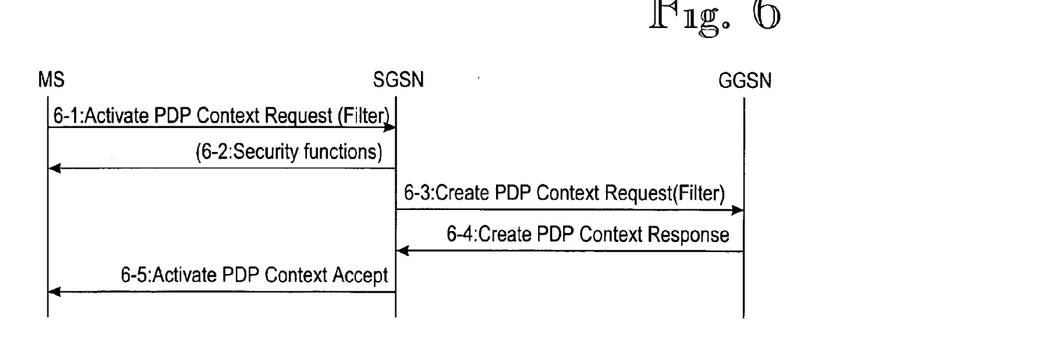
FIGS. 6 and 7 show transporting filter information in a context activation or modification procedure, respectively.

FIG. 6 shows how a mobile station can configure the QoS mapping and interworking actions by means of a context activation procedure according to the invention. In step 6-1, the MS sends to the SGSN an Activate PDP Context Request comprising an NSAPI, a PDP type, a PDP address, an Access Point Name, QoS Requested, a Filter Specification and PDP configuration options. (For understanding the present invention, the important parameters are the Filter and QoS information.) The MS may use the PDP Address to indicate whether it requires the use of a static or a dynamic PDP address. In the latter case, the MS shall leave the PDP Address empty. The MS may use the Access Point Name to select a reference point to a certain external network. The Access Point Name is a logical name referring to the external packet data network that the subscriber wishes to connect to. The QoS Requested indicates the desired QoS profile. The Filter specification indicates which external data packets are associated with a particular PDP context. Packets indicated by the filtering conditions of this filter should be considered as belonging to this particular PDP context. PDP Configuration Options may be used to request optional PDP parameters from the GGSN (see GSM recommendation 09.60). PDP Configuration Options are sent transparently through the SGSN.

Using dynamic configuration and dynamic PDP addresses involves the problem of how to ensure that the context activation affects the correct GGSN, and how the GGSN knows whether to activate a new context with the same IP address or a different address. Three solutions for this problem can be found:

1. Using an Access Point Name which points to a certain GGSN node and indicates that another context is needed, and using the same IP address.

2. Adding an indication (such as a new information element) to the context activation request, indicating to the GGSN (and the SGSN) that another context is needed. This context has the same IP address as the previous one. In this case the SGSN selects the same GGSN as for the previous context of that PDP type.

3. Adding the PDP and IP addresses desired for the context to the context activation request message. This PDP/IP address may be given to one of the previous contexts, i.e. a dynamic address. In this case, the SGSN selects the GGSN which is handling that particular address.

Security functions may be performed in step 6-2, but they are not relevant to understanding the invention.

In step 6-3, the SGSN validates the request 6-1. The SGSN creates a Tunnel Identifier TID for the requested PDP context by combining the IMSI stored in the MM context with the NSAPI received from the MS. The SGSN may restrict the requested QoS attributes considering its capabilities, the current load, and the subscribed QoS profile. Next, in step 6-3 the SGSN sends a Create PDP Context Request (comprising a PDP type, a PDP address, an Access Point Name, the negotiated QoS Profiles, the desired filter, the TID, and PDP configuration options) to the GGSN. The GGSN may also restrict the requested QoS attributes considering its capabilities, and the current load. If the MS requests a dynamic address, then the SGSN lets a GGSN allocate the dynamic address. The SGSN may restrict the requested QoS attributes given its capabilities, the current load, and the subscribed QoS profile. The SGSN sends a Create PDP Context Request (PDP Type, PDP Address, Access Point Name, QoS Negotiated, Filter spec, TID, Selection Mode, PDP Configuration Options) message to the affected GGSN. The Access Point Name is the APN Network Identifier of the APN selected. The PDP Address shall be empty if a dynamic address is requested. The GGSN may use the Access Point Name to find an external network. The Selection Mode indicates whether a subscribed APN was selected, or whether a non-subscribed APN sent by MS or a non-subscribed APN chosen by SGSN was selected. The GGSN may use the Selection Mode when deciding whether to accept or reject the PDP context activation. For example, if an APN requires subscription, then the GGSN is configured to accept only the PDP context activation that requests a subscribed APN as indicated by the SGSN with the Selection Mode. The GGSN creates a new entry in its PDP context table and generates a Charging Id. The new entry allows the GGSN to route PDP PDUs between the SGSN and the external PDP network, and to start charging. The GGSN may further restrict the QoS Negotiated considering its capabilities and the current load. The GGSN will maintain information for QoS mapping and multiplex incoming data packets from the external network onto the active PDP contexts according to the defined filtering conditions at the GGSN. For outgoing packets, a certain external QoS might be associated with the packets of a particular PDP context. The GGSN then returns a Create PDP Context Response (TID, PDP Address, BB Protocol, Reordering Required, PDP Configuration Options, QoS Negotiated, Charging Id, Cause) message to the SGSN. The PDP Address is included if the GGSN allocated one. The BB Protocol indicates whether TCP or UDP should be used to transport user data on the backbone network between the SGSN and the GGSN. The Reordering Required indicates whether the SGSN should reorder N-PDUs before delivering the N-PDUs to the MS. The PDP Configuration Options contain optional PDP parameters that the GGSN may transfer to the MS. These optional PDP parameters may be requested by the MS in the Activate PDP Context Request message, or may be sent unsolicited by the GGSN. The PDP Configuration Options are sent transparently through the SGSN. The Create PDP Context messages are sent over the GPRS backbone network. If the QoS Negotiated received from the SGSN is incompatible with the PDP context being activated (e.g., the reliability class is insufficient to support the PDP type), then the GGSN rejects the Create PDP Context Request message. The compatible QoS profiles can be configured by the GGSN operator.

Figure 7:
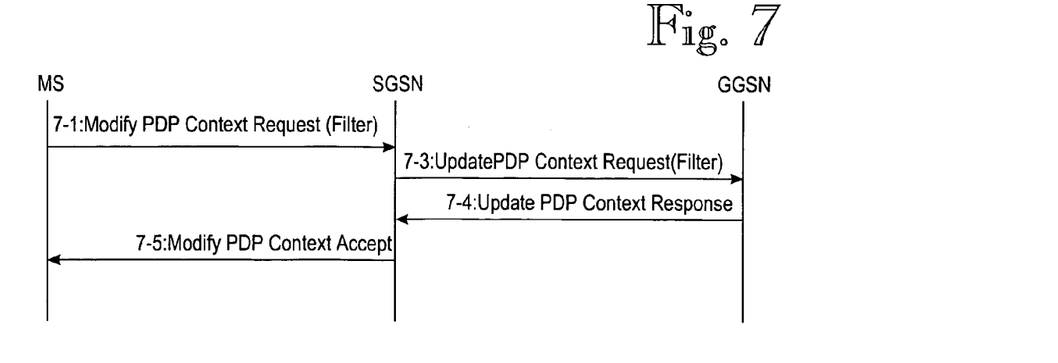

In step 6-4, the GGSN returns a Create PDP Context Response (comprising a TID, a PDP Address, the negotiated QoS Profiles, and PDP configuration options) to the SGSN.

negotiated (included in the request message). In steps 7-4 and 7-5 a positive response is returned to the MS.

Basic versions of the messages 7-1 through 7-5 are known from GPRS phase 2. According to the invention, the messages 7-1 and 7-3 are modified to convey the desired filtering parameters (and the messages 7-4 and 7-5 are modified to return a suitable acknowledgement).

According to yet another embodiment of the invention, the filter function in a first direction (e.g. downlink) can be modified using information included in the packets sent in the second direction (e.g. uplink). This embodiment requires no extra signalling. According to this exemplary embodiment, the following traffic classes are defined (RT=Real-Time, NRT=Non-Real-Time):

| Traffic class | Conversational (RT) guaranteed capacity no ARQ | Streaming (RT) guaranteed capacity ARQ (MAC level) Add. Buffering in application | Interactive (NRT) best effort ARQ interactive www, Telnet RT control channel | Background (NRT) best effort ARQ background downloading of e-mail, calendar events, etc. |
|---|---|---|---|---|
| Delay | 100 ms, 200 ms, 400 ms | <1 s | 2 s | N/A |
| BER | $10^{-3}, 10^{-4}, 10^{-5}$ | $10^{-5}, 10^{-6}, 10^{-7}, 10^{-8}$ | $<10^{-9}$ | $<10^{-9}$ |
| Max bitrate | Guaranteed | Guaranteed | Not guaranteed | Not guaranteed |
| Service precedence | High, medium, low | High, medium, low | High, medium, low | High, medium, low |

The SGSN inserts the NSAPI with the GGSN address in the PDP context. If the MS has requested a dynamic address, the PDP address received from the GGSN is inserted in the PDP context. The SGSN selects a Radio Priority based on QoS Negotiated, and returns an Activate PDP Context Accept (PDP Type, PDP Address, TI, QoS Negotiated, Radio Priority, PDP Configuration Options) message to the MS. The SGSN is now able to route PDP PDUs between the GGSN and the MS, and to start charging.

Next, in step 6-5, the SGSN selects a Radio Priority Level based on each negotiated QoS profile, and returns an Activate PDP Context Accept (comprising a PDP type, a PDP Address, an NSAPI, the negotiated QoS Profiles, a Radio Priority Level and a SAPI for each QoS profile, the filter and PDP configuration options) to the MS. Now the SGSN is able to route PDP PDUs between the GGSN and the MS. The SAPI indicates which QoS profile uses which SAPI.

FIG. 7 shows a context modification procedure. In step 7-1 the MS sends the SGSN a Modify PDP Context Request. In step 7-3 the SGSN sends to the GGSN an Update PDP Context Request. Both of these requests comprise the filter with modified parameters. The filter indicates which external data packets are associated with a particular PDP context. Packets indicated by the filtering conditions should be interpreted as belonging to this particular PDP context and they should be provided with the QoS negotiated for the context. The Update PDP Context Request message is used to add, modify or cancel a QoS profile of a PDP context. If the GGSN receives from the SGSN a negotiated QoS which is incompatible with the PDP context being modified (e.g. the reliability class is insufficient to support the PDP type), the GGSN rejects the request. Compatible QoS profiles are configured by the GGSN operator. The GGSN may again restrict the requested QoS attributes considering its capabilities, and the current load. The GGSN stores the negotiated QoS values. The GGSN revises the QoS mapping information to conform to the new filter spec and Qos Profile Conversational and Streaming classes are real-time oriented traffic classes for which resources are reserved. Interactive and Background classes are best effort classes, which do not have reserved resources. For these classes, GPRS style resource allocation can be used, i.e. the MS sends radio resource requests on demand.

For the real time classes, i.e. the Conversational and Streaming classes, the method presented above is very efficient, i.e. the filter information is carried in PDP context operations to the GGSN so that GGSN can map incoming IP packets to the correct QoS class. However, with Interactive and Background classes this involves large amounts of signalling, which in some situations might be unacceptable. An example of such a situation is a query sent to a Domain Name Server DNS (not shown), in which case the net flow might consist of only two packets.

In this example, the Interactive class is selected as the default QoS class. This means that if there is no information about the QoS requirement of an incoming flow, or the flow information does not conform to any of the filter conditions, the Interactive class will be selected. In addition, flows belonging to the background class can be identified by the GGSN "on the fly". This means that when the GGSN gets a packet from the MS in the Background class, it will take notice of the flow identification information, and modify the filter characteristics associated with the background class, to map the downlink flow corresponding to the flow in question to the Background class. When a packet comes in the downlink direction, the GGSN checks the flow identification information associated with the Background class. If the flow filter information associated with the Background class matches the header information of the received IP packet, then the packet is directed to the Background class.

Flow information related to the Background class can be handled as follows. The MS has knowledge about flows that should be carried using the Background class. The user can configure this mapping of flows to the Background class. For example, the user can configure file transfers to use the Background class by using a suitable configuration application. Alternatively, the information can be obtained e.g. from some external QoS information (e.g. Internet QoS information). In other words, the MS has filter criteria for flows to be mapped to the Background class. An essential feature of this embodiment is that the MS has knowledge on which flows should be directed to the Background class, and it sends these packets to the corresponding link. When the GGSN receives packets from the MS, it knows the QoS class the packets are associated with. When the GGSN gets a packet from the Background class it checks whether it already has an entry for that flow in a list (not shown) which contains flow information of all flows belonging to the Background class. If there is no entry for that flow in the list, the GGSN modifies the filter used when mapping the downlink flows to the Background class so that the downlink flow corresponding to the uplink flow the received packet belongs to will be mapped to the Background class. This can be done by including the flow identification information of the uplink packet to the flow information list from which the downlink packets are mapped to the Background class. So, flows belonging to the background class are identified in the GGSN "on the fly".

When the GGSN receives a packet from the Internet or from any other external network, it checks the filter information associated with Conversational, Streaming and Background classes. If the GGSN finds that the characteristics of the packet conform to the relevant filter conditions, it forwards the packet to the corresponding QoS class. If there is no entry for that particular flow, then the packet is forwarded to the Interactive class, which is the default class.

This embodiment dramatically decreases the need for signalling because the Interactive class will be the most frequently used QoS class. There are many cases in which IP packets do not actually form a flow, but there are instead only one or a few IP packets going uplink and a few packets coming downlink as a response. A DNS query is a good example of this kind of behaviour. Signalling of the PDP context modification in these cases would cause a relatively high amount of signalling which can be avoided using this embodiment. Instead, only the initial PDP context activation is needed to obtain an IP address for the MS.

Figure 8:
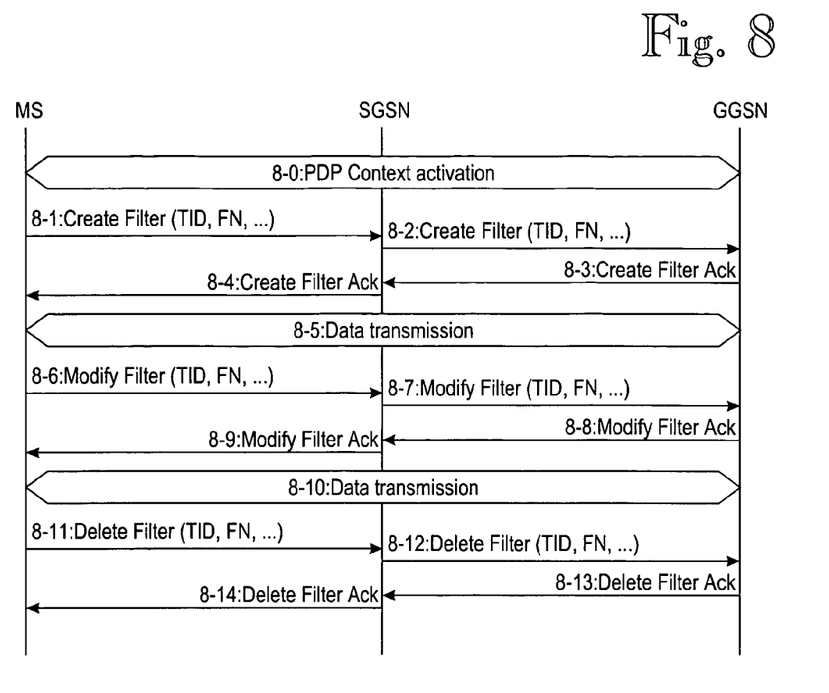
FIGS. 8 and 9 show two different implementations for configuring the filter information in dedicated messages.
Figure 9:
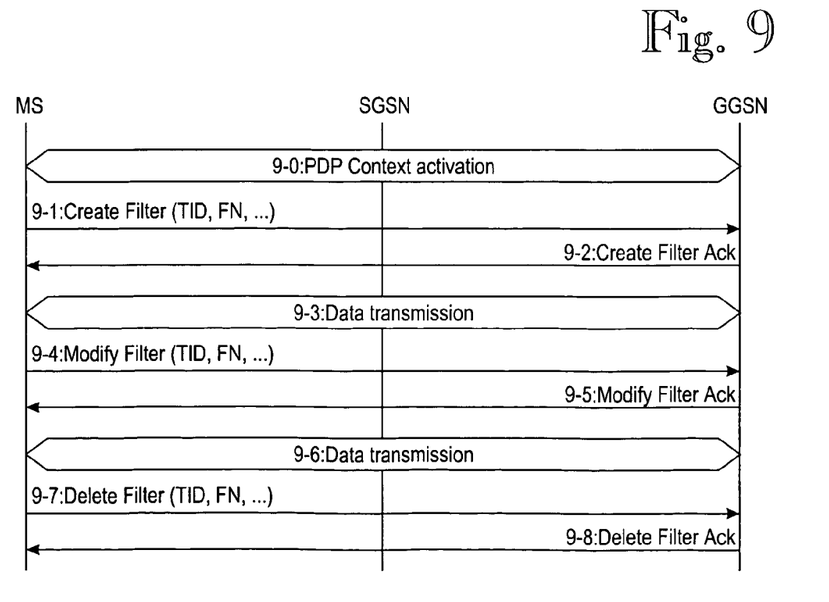

A residual problem in the approach shown in FIGS. 6 and 7 is that it may not be clear how to add filtering information in addition to the filter for the PDP context, or modify the existing filters without first removing all the existing filters and then resending all filter information, including the changes. In other words, if PDP context activation and modification procedures are always used, the entire filtering information has to be included in the messages even if only one parameter value is to be changed. Adding a new filter requires sending all filters at the same time. Consequently, FIGS. 8 and 9 illustrate a preferred embodiment of the invention which aims at solving this residual problem.

It is proposed that there should be at least one dedicated message for configuring the filter information. In this context, 'dedicated' means that the message does not carry PDP context information. A filter handle should be defined for identifying a certain filter of a certain PDP context. This filter handle may consist of a Tunnel Identifier TID, which indicates the user and the PDP context, and a filter number FN. The latter can be a sequence number selected by the MS when creating a filter. In summary, the filters can be configured by the following procedures:

1. One or more filters may be created in association with the PDP context activation procedure (see FIG. 6). In this case, one or many filter information elements are included in the PDP context activation messages, each filter element being identified by a distinct filter number (1, 2, 3, etc.).

2. Filters may be modified in association with the PDP context modification procedure (see FIG. 7). In this case, one or more filter parameters of one or more filters may be modified by adding filter information elements in the PDP context modification request. Independent filters are identified by a filter number. New filters may be created using this procedure as well. In this case a new filter information element (e.g. a new, previously unused filter number) is included in the modification request message.

3. New filter operations (one or more dedicated messages): Three operations between the MS and the GGSN are proposed for configuring the filters:

3.1 Create filter: This message carries TID information, as well as the new filter element and a new filter number. The GGSN creates a new filter according to the contents of the message.

3.2 Modify filter: This message carries TID information, as well as the new filter element replacing the old one and a filter number identifying the particular filter to the replaced. The GGSN replaces the filter attribute(s) of the indicated filter with the new one(s).

3.3 Delete filter: This message carries TID information, as well as the filter number of the filter to be removed. The GGSN removes that particular filter.

It should be noted that the operations 3.1 through 3.3. may be combined to use only one or two different message types, but also three different messages (one per each operation) may be defined. The defined messages may be GTP messages in which case new GTP messages should be defined (in other words, new message identifiers in GTP). In this case, the TID information is automatically included in the GTP packet headers and it does not have to be a separate information element in the message. Alternatively, a new protocol for filter operations may be defined between the MS and the GGSN, in which case the SGSN would be totally transparent to these messages.

FIG. 8 shows a first implementation of the new filter operations 3.1 through 3.3. In step 8-0 a PDP context is activated for the MS. The details of this operation have already been outlined in connection with the previous figures. In step 8-1 the MS sends a CREATE FILTER message to the SGSN. This message has as parameters the Tunnel Identifier TID (which specifies the PDP context) and a filter number FN (which specifies a certain filter within the PDP context). Naturally, the CREATE FILTER message should also include the characteristics of the filter. In step 8-2 the message is relayed from the SGSN to the GGSN. Steps 8-3 and 8-4 are corresponding acknowledgements. In step 8-5 data transmission takes place to/from the MS. Steps 8-6 through 8-9 correspond to steps 8-1 through 8-4, except that in the latter steps the MS (or an application being executed) modifies an existing filter by sending a MODIFY FILTER message. In steps 8-11 through 8-14 a filter, which is no longer needed, is deleted by sending a DELETE FILTER message.

The implementation shown in FIG. 8 is based on existing protocols. The messages between the MS and the SGSN can be e.g. session management messages and the messages between the SGSN and the GGSN can be e.g. GTP messages. As can be seen, negotiating a filter between an MS and a GGSN is needlessly complex because there are no predefined protocols between the MS and the GGSN.

For clarity, the messages 8-1, 8-6 and 8-11 have been shown as three separate messages. Alternatively, all these operations could use only one message, e.g. CONFIGURE FILTER, which includes a parameter such as 1=create, 2=modify, 3=delete.

FIG. 9 shows an alternative implementation where there is a protocol layer between the MS and the GGSN, and the SGSN is a transparent node which does not interpret the messages in any way.

The embodiment and the different implementations shown in FIGS. 8 and 9 provide a very flexible scheme where independent (e.g. application-specific) filters can be added and modified dynamically using special filter operations. A special filter handle is used to identify the independent filters.

The description only illustrates preferred embodiments of the invention. The invention is not, however, limited to these examples but it may vary within the scope of the appended claims. For example, it is not necessary that the receiving terminal is a mobile station but it can be any network element. Similarly, it is not necessary that the MT data packets originate from the IP network. Instead, the invention is applicable e.g. in a MS to MS call via a GGSN node. In this case the leg from one MS to the GGSN is a first communication subsystem and the leg from the GGSN to the other MS is a second communication subsystem.

We claim:

1. A method for sending data packets from a first communication subsystem via a first network element to a second network element in a second communication subsystem;

the method comprising:
sending the data packets in a first plurality of data flows in the first communication subsystem;
mapping the first plurality of data flows to a second plurality of data flows in the second communications subsystem;
establishing at least one filter for controlling the mapping;
associating the at least one filter with a data flow within the second plurality of data flows; and
mapping at least one data flow on the basis of the filter; and
configuring the filter from the second network element,
wherein at least one of the data flows is bidirectional having a first direction from the first plurality of data flows to the second plurality of data flows and a second direction which is inverse to the first direction, and the at least one filter is modified to update a Quality of Signal profile of a PDP context on the basis of user data packets sent in the second direction.

2. A method according to claim 1, further comprising configuring the filter in a packet data protocol context activation or modification message.

3. A method according to claim 2, further comprising configuring at least two filters in one packet data protocol context activation or modification message and identifying each filter with a distinct identifier.

4. A method according to claim 1, further comprising configuring the at least one filter in a dedicated message.

5. A method according to claim 1, further comprising configuring the filter in a message which is transparent to at least some nodes between the first and the second network elements.

6. A method according to claim 1, wherein the first communications subsystem is an Internet Protocol network and the method comprises allocating one IP address which is shared by all data flows within the second plurality of data flows.

7. A method according to claim 1, wherein the first communications subsystem is an Internet Protocol network, and the method comprises allocating a separate Internet Protocol address to each data flow within the second plurality of data flows.

8. A method according to claim 1, wherein the second communications subsystem is a packet radio network employing packet radio protocol, and the configuring step comprises sending a packet radio protocol context activation message or a packet radio protocol context modification message.

9. A method according to claim 1, wherein the associating is based on the second network element's address in the first communication subsystem.

10. A method according to claim 1, wherein the associating is based on the second network element's identifier in the second communication subsystem.

11. A method according to claim 10, wherein the second network element's identifier is its International Mobile Subscriber Identity or tunnel identifier.

12. A method according to claim 1, further comprising:
performing the mapping on the basis of the filter to data flows conveying real-time information; and
establishing default parameters for mapping the remaining data flows.

13. A method according to claim 1, further comprising defining one data flow within the second plurality of data flows as a default data flow, to which all data flows of the first plurality of data flows are mapped which do not conform to the at least one filter.

14. A method according to claim 1, wherein a gateway element mapping the data flows:
receives a data packet in the second direction from a first data flow within the second plurality of data flows;
forwards the data packet to a second data flow within the first plurality of data flows; and
modifies the at least one filter for mapping the second data flow to the first data flow.

15. A method according to claim 1, wherein at least one data flow within the first plurality of data flows is tunneled over a data flow within the second plurality of data flows, and at least two data flows within the second plurality of data flows have mutually different Quality of Service characteristics.

16. A method according to claim 1, wherein the second network element is a mobile station.

17. A method according to claim 1, wherein the second network element is a mobile station.

18. A first network element for routing data packets from a first communication subsystem to a second network element in a second communication subsystem;
the first network element being configured to:
receive the data packets from the first communication subsystem in a first plurality of data flows;
map the first plurality of data flows to a second plurality of data flows in the second communication subsystem;
establish at least one filter for controlling the mapping;
associate the at least one filter with a data flow within the second plurality of data flows;
map at least one data flow on the basis of the filter;
receive a mobile station-generated digital configuration signal for configuring the filter; and to
configure the filter on the basis of the mobile station-generated digital configuration signal,
wherein at least one of the data flows is bidirectional having a first direction from the first plurality of data flows to the second plurality of data flows and a second direction which is inverse to the first direction, and the at least one filter is modified to update a Quality of Signal profile of a PDP context on the basis of user data packets sent in the second direction.

19. A first network element according to claim 18, wherein the first network element is a Gateway GPRS Support Node.

20. A mobile station for a packet radio network, configured to send a digital configuration signal for creating or modifying a packet data protocol context in a support node for interfacing an external communication subsystem with the packet radio network;

wherein the digital configuration signal comprises information which at least partially defines a filter for controlling mapping of data flows from the external communication subsystem to the packet radio network by the support node, wherein at least one of the data flows is bidirectional having a first direction from the external communication subsystem to the packet radio network and a second direction which is inverse to the first direction, and the filter is modified to update a Quality of Signal profile of a PDP context on the basis of user data packets sent in the second direction.

* * * * *